(12) United States Patent
Truong et al.

(10) Patent No.: US 11,657,727 B2
(45) Date of Patent: *May 23, 2023

(54) INTELLIGENT SYSTEMS BASED TRAINING OF CUSTOMER SERVICE AGENTS

(71) Applicant: TTEC Holdings, Inc., Englewood, CO (US)

(72) Inventors: Henry Truong, Chelmsford, MA (US); Gershwin Allson Lamont Exeter, Toronto (CA); Louise Juanita Erven, North Bay (CA)

(73) Assignee: TTEC Holdings, Inc., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,146

(22) Filed: Mar. 20, 2022

(65) Prior Publication Data

US 2022/0208015 A1 Jun. 30, 2022

Related U.S. Application Data

(63) Continuation of application No. 16/588,827, filed on Sep. 30, 2019, now Pat. No. 11,282,405.
(Continued)

(51) Int. Cl.
    G09B 5/12      (2006.01)
    G06K 9/00      (2022.01)
    G10L 15/26     (2006.01)
    G09B 5/06      (2006.01)
    H04M 3/51      (2006.01)
    G06V 40/16     (2022.01)

(52) U.S. Cl.
    CPC ............ G09B 5/12 (2013.01); G06V 40/174 (2022.01); G10L 15/26 (2013.01); H04M 3/5175 (2013.01)

(58) Field of Classification Search
    CPC . G09B 5/12; G09B 5/06; G10L 15/26; H04M 3/5175; H04M 2203/403; G06K 9/00302
    USPC ............ 434/219, 350, 262, 365; 379/265.05, 379/265.06, 265.07
    See application file for complete search history.

(56) References Cited

U.S. PATENT DOCUMENTS 6,944,596 B1   9/2005   Gray
7,854,653 B2   12/2010  Kane
(Continued)

FOREIGN PATENT DOCUMENTS

WO   WO 2020/072443   4/2020

OTHER PUBLICATIONS

International Search Report and Written Opinion dated Feb. 27, 2020 in PCT/US2019/053991.
(Continued)

Primary Examiner — Thjuan K Addy
(74) Attorney, Agent, or Firm — Critical Path IP Law, LLC

(57) ABSTRACT

A system and method of use to train customer service agents. The training system employs intelligent systems to facilitate or enable the training of customer service agents. The training system provides training to customer service agents and tracks the progress of the customer service trainees. In one aspect, the training system emulates a customer engaging with the customer service trainee, by emulating one or both of the persona of the customer and the scenario of the customer/trainee interaction.

20 Claims, 7 Drawing Sheets

Related U.S. Application Data

(60) Provisional application No. 62/741,016, filed on Oct. 4, 2018.

(56) References Cited

U.S. PATENT DOCUMENTS

| | | |
|---|---|---|
| 8,554,705 B1 | 10/2013 | Sitnikau |
| 10,740,712 B2 | 8/2020 | Nies |
| 11,200,813 B1 | 12/2021 | Selix |
| 2003/0008266 A1 | 1/2003 | LoSasso |
| 2004/0014016 A1 | 1/2004 | Popeck |
| 2005/0170326 A1 | 8/2005 | Koehler |
| 2008/0124690 A1 | 5/2008 | Redlich |
| 2009/0035736 A1 | 2/2009 | Wolpert |
| 2014/0140497 A1 | 5/2014 | Ripa |
| 2014/0322691 A1 | 10/2014 | Yavari |
| 2016/0189164 A1* | 6/2016 | Tolksdorf ............ G06Q 30/016 705/304 |
| 2017/0213132 A1 | 2/2017 | Hammond |
| 2017/0270822 A1 | 9/2017 | Cohen |
| 2018/0110460 A1 | 4/2018 | Danson |

OTHER PUBLICATIONS

"Digital Assistants Start To Get More Human," Ted Greenwald, Wall Street Journal, Apr. 29, 2018.

USPTO Notice of Allowance in U.S. Appl. No. 16/588,827 dated Jan. 11, 2022.

IP Australia Examination Report No. 1 in AU Appl No. 2019354980 dated Feb. 8, 2022.

IP Australia Examination Report No. 2 in AU Appl No. 2019354980 dated May 3, 2022.

Canadian IP Office, Requisition in CA Appl No. 3,115,090 dated Mar. 28, 2022.

European Patent Office Extended European Search Report in Appl No. 19868755.0 dated Apr. 21, 2022.

IP India First Examination Report in IN Appl No. 202117018529 dated Aug. 12, 2022 (nationalized application from PCT/US2019/053991).

European Patent Office Examination Report in Appl No. 19868755.0 dated Feb. 8, 2023.

\* cited by examiner

INTELLIGENT SYSTEMS BASED TRAINING OF CUSTOMER SERVICE AGENTS

CROSS-REFERENCE TO RELATED APPLICATION

This application is a continuation of U.S. patent application Ser. No. 16/588,827 filed Sep. 30, 2019 and titled "Intelligent Systems Based Training of Customer Service Agents," which in turn claims the benefit of U.S. Provisional Patent Application No. 62/741,016 filed Oct. 4, 2018 and titled "Intelligent Systems Based Training of Customer Service Agents," the disclosures of which are incorporated herein by reference in their entireties.

FIELD

The disclosure relates generally to training of customer service agents, and more specifically to systems and methods of training customer service agents using intelligent systems.

BACKGROUND

Training of employees is a regular requirement of employers. Traditional approaches to train employees are labor and time intensive and result in inconsistent results. Furthermore, traditional training approaches require in-situ synchronous execution in that the trainee must perform training tasks in a defined sequence and at an in-person at a training facility.

The challenges of employee training are more acute when a surge of new employees must be trained at once. Such a scenario is common in several businesses, to include the training of new customer service agents due to seasonal or regulatory sequences. For example, the "open enrollment" periods for health insurance create a large surge in demand for customer service agents to assist customers with health care enrollment decisions.

What is needed is a system and method of use that may effectively and efficiently train new employees in an asynchronous manner in that the trainee may perform training tasks in a sequence most optimized for their individual learning, and in a location of their choosing, to include remotely. Furthermore, a training system is needed that may reduce costs to train, improve operational speed to proficiency, and reduce the need for facilitators and support staff. The disclosure solves these needs.

The disclosure describes a suite of innovative learning methods, grounded in the application of intelligent systems, artificial intelligence (AI) and/or machine learning (ML), to expand the number of hyper-personalized training hours, using different digital learning channels, while lower the cost of training delivery and coaching. The use of intelligent machines or intelligent systems enable learners to learn at a self-selected speed and propel through training at accelerated speeds. As the result, the facilitator may become more effective by targeting and working more closely with medium to low performing trainees for more improved on-boarding or training.

More specifically, the benefits of the disclosure may include lower cost through, e.g., expediting the on-boarding process, lowering the cost to facilitate training, and reducing the number of facilitators and support staff. The disclosed systems and methods automate actions formerly associated with facilitators (providing instruction), team leaderships (providing coaching) and quality (providing evaluations) at scale. Also, the disclosed systems and methods provide, through automated AI elements, personalized, facilitation of real-time feedback, coaching and exemplary examples. As the result, faster feedback is achieved to lessen the on-boarding and nesting periods; the projected time savings may be as high as 20%.

Furthermore, the disclosed systems and methods may improve quality of training by, e.g., improving the operational speed to proficiency, and by enabling asynchronous training. The digital simulations of the systems of methods of the disclosure may be combined with traditional classroom learning to lessen dependency on facilitators and allow learners or trainees to train at home and during desired work hours of the learner's choosing. As the result, trainee attrition rates may be reduced.

Among other things, the disclosed system and methods introduce the experience of best-of-class customer service agent experience to new trainees and increase the hands-on and practical learning opportunities for trainees. Also, operational performance metrics of a trainee are collected and analyzed, which are used to predict operational performance, attrition and development areas. The systems and methods of the disclosure also provide consistent interpretation of trainee operational performance metrics and quality analytics with respect to time to desired performance and achievement of operational key performance indicators. As the result, the trainees are better prepared and more confident in less time.

The phrases "intelligent system," "artificial intelligence," "bot" or "Bot," and "AI" mean a machine, system or technique that mimics human intelligence.

The phrase "machine learning" means a subset of AI that uses statistical techniques to enable machines to improve at tasks with experience.

The phrases "neural networks" and "neural nets" means an AI construction modeled after the way adaptable networks of neurons in the human brain are understood to work, rather than through rigid predetermined instructions.

The phrase "natural-language processing" means computer processing that occurs in speech-recognition technology in which software recognizes spoken sentences or phrases and recreate spoken language into text.

By way of providing additional background, context, and to further satisfy the written description requirements of 35 U.S.C. § 112, the following are incorporated by reference in entirety: U.S. Pat. No. 8,554,705 to Sitnikau and U.S. Pat. No. 7,854,653 to Kane, and US Patent Publication Nos. 2008/0124690 to Redlich and 2017/0213132 to Hammond.

SUMMARY

The present disclosure can provide several advantages depending on the particular aspect, embodiment, and/or configuration. Generally, systems and methods of training customer service agents using intelligent systems are disclosed.

The training system employs intelligent systems to facilitate and/or enable the training of the customer service agents. The training system provides training to customer service agents and tracks the progress of the customer service agent trainees. Furthermore, the training system emulates a customer engaging with the customer service agent trainee, by emulating one or both of the persona of the customer and the scenario of the customer/trainee interaction.

In one embodiment, a method to train a customer service agent trainee is disclosed, the method comprising: providing a computer-based learning environment to a customer service agent trainee; generating a set of interactions between the customer service agent trainee and a simulated customer, the set of interactions configured for presentation to the customer service agent trainee on the computer-based learning environment; selecting a first interaction from the set of interactions; presenting the first interaction to the customer service agent trainee on the computer-based learning environment; measuring an interaction performance of the customer service agent trainee in the first interaction to create an interaction performance measurement; based on the interaction performance measurement, selecting an exemplar interaction from the set of interactions; and presenting the exemplar interaction to the customer service agent trainee on the computer-based learning environment.

In one aspect, the method further comprises presenting the interaction performance measurement to the customer service agent trainee on the computer-based learning environment. In another aspect, the method further comprises creating a text conversion of verbal input provided by the customer service agent trainee during the first interaction. In another aspect, the interaction performance measurement is measured with respect to a set of exemplar interactions. In another aspect, the interaction performance measurement is measured with respect to an appraisal of facial-recognition features of the customer service agent trainee. In another aspect, the computer-based learning environment is remotely accessed by the customer service agent trainee by way of a portable electronic device. In another aspect, the set of interactions comprise text interactions and voice interactions. In another aspect, the set of interactions are a set of dialogues. In another aspect, the first interaction to the customer service agent trainee is presented in real-time. In another aspect, the simulated customer is selected from a set of simulated customers, each of the simulated customers associated with a particular persona. In another aspect, the set of interactions are associated with new hire training. In another aspect, the set of interactions are associated with a set of training scenarios of new hire training. In another aspect, the interaction performance measurement is provided to a supervisory trainer. In another aspect, the set of interactions are associated with a set of audio and video files.

In another embodiment, a system to train a customer service agent trainee is disclosed, the system comprising: a computer-based learning environment device configured to interact with a customer service agent trainee; an emulator module comprising a dialogue engine and a measurement module, the dialogue engine generating a set of interactions between the customer service agent trainee and a simulated customer and selecting a first interaction from the set of interactions, the set of interactions configured for presentation to the customer service agent trainee on the computer-based learning environment device, and the measurement module measuring an interaction performance measurement of the customer service agent trainee in the first interaction; wherein: based on the interaction performance measurement, an exemplar interaction from the set of interactions is selected; and the exemplar interaction is presented to the customer service agent trainee on the computer-based learning environment.

In one aspect, the simulated customer is selected from a set of simulated customers, each of the simulated customers associated with a particular persona. In another aspect, the set of interactions are associated with a set of audio and video files. In another aspect, the set of interactions comprise text interactions and voice interactions. In another aspect, the set of interactions are a set of dialogues. In another aspect, the set of interactions are presented in real-time.

In one embodiment, a training system to provide asynchronous and individualized training to a customer service agent trainee is disclosed, the system comprising: a customer emulator module comprising: a conversation event annotation module; a conversation flow map module; and a scenario builder app; wherein: the conversation event annotation module receives a conversational transcript and produces an annotated transcript comprising a plurality of events, tagged variables, and tagged skill behaviors, and a plurality of clustered utterances; the conversation flow map module receives the annotated transcript and the plurality of clustered utterances to train RNN models and produce a conversation flow map module output; and the scenario builder app receives the conversation flow map module output to produce a trainee scenario card, the trainee scenario card used to provide asynchronous and individualized training to a customer service agent trainee.

In one aspect, the system further comprises a conversation NLU discovery module configured to create a scenario conversation module and provide a conversational transcript to the conversation event annotation module. In another aspect, the system further comprises a speech to text module configured to receive data from a plurality of media types and create a text output. In another aspect, the text output is received by the conversation NLU discovery module. In another aspect, the plurality of media types comprise audio and video files. In another aspect, the clustered utterances comprise predictions of utterance matches. In another aspect, the system further comprises an IVA module, the IVA module in communication with the trainee scenario card to provide a trainee scenario involving a customer with a particular persona. In another aspect, the conversation flow map module identifies repetitive conversational events. In another aspect, the system further comprises a trainee evaluation module configured to record interactions between the customer service agent trainee and the system. In another aspect, the trainee evaluation module monitors customer service agent trainee performance against a set of knowledge skill metrics. In another aspect, the system further comprises a gamification module configured to incentivize the customer service agent trainee to meet or exceed the set of knowledge skill metrics. In another aspect, the system may be operated by the customer service agent trainee remotely by way of a portable electronic device. In another aspect, the asynchronous and individualized training is new hire training. In another aspect, the asynchronous and individualized training is new skill training.

In another embodiment, a method to provide asynchronous and individualized training to a customer service agent trainee is disclosed, the method comprising: providing a computer-based learning environment to the customer service agent trainee, the customer service agent trainee logging into the computer-based learning environment; emulating a plurality of customer scenarios using a customer emulator module; recording a performance of the customer service agent trainee with respect to the plurality of customer scenarios; tracking the performance of the customer service agent trainee to discover training patterns; and providing the training patterns and the performance of the customer service agent trainee to a supervisory trainer.

In one aspect, the customer emulator module comprises: a conversation event annotation module which receives a conversational transcript and produces an annotated transcript comprising a plurality of events, tagged variables, and tagged skill behaviors, and a plurality of clustered utterances. In another aspect, the method further comprises a conversation flow map module which receives the annotated transcript and the plurality of clustered utterances to train RNN models and produce a conversation flow map module output. In another aspect, the method further comprises a scenario builder app which receives the conversation flow map module output to produce a trainee scenario card, the trainee scenario card used to provide asynchronous and individualized training to a customer service agent trainee. In another aspect, the method further comprises a conversation NLU discovery module configured to create a scenario conversation module and provide a conversational transcript to the conversation event annotation module. In another aspect, the asynchronous and individualized training is at least one of new hire training and new skill training.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably. The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Various embodiments or portions of the system methods of use may also or alternatively be implemented partially in software and/or firmware, e.g. metrics and/or guidelines to alter the training scenarios or customer personas, etc. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

The following disclosure generally relates to a system and method of use to train a customer service agent trainee or a set of customer service agent trainees. A customer service agent trainee may be referred to as an agent trainee, and/or a trainee. In one embodiment, the customer service agent trainee is a call center trainee, a call center agent and/or a call center employee. The disclosed system to so train one or a set of customer service agent trainees may be referred to as the customer service agent trainee system, trainee system and/or the system. The method of use of the customer service agent trainee system may be referred to as the method, trainee method and/or the method of use.

The customer service agent trainee system employs intelligent systems to facilitate and/or enable the training of one or more customer service agent trainees. The customer service agent trainee system provides training to customer service agent trainees and tracks the progress of the customer service agent trainees. Furthermore, the customer service agent trainee system emulates a customer engaging with the customer service agent trainee, by emulating one or both of the persona of the customer (also referred to as a simulated customer) and the scenario of the interaction between a simulated customer and the customer service agent trainee.

Figure 1:
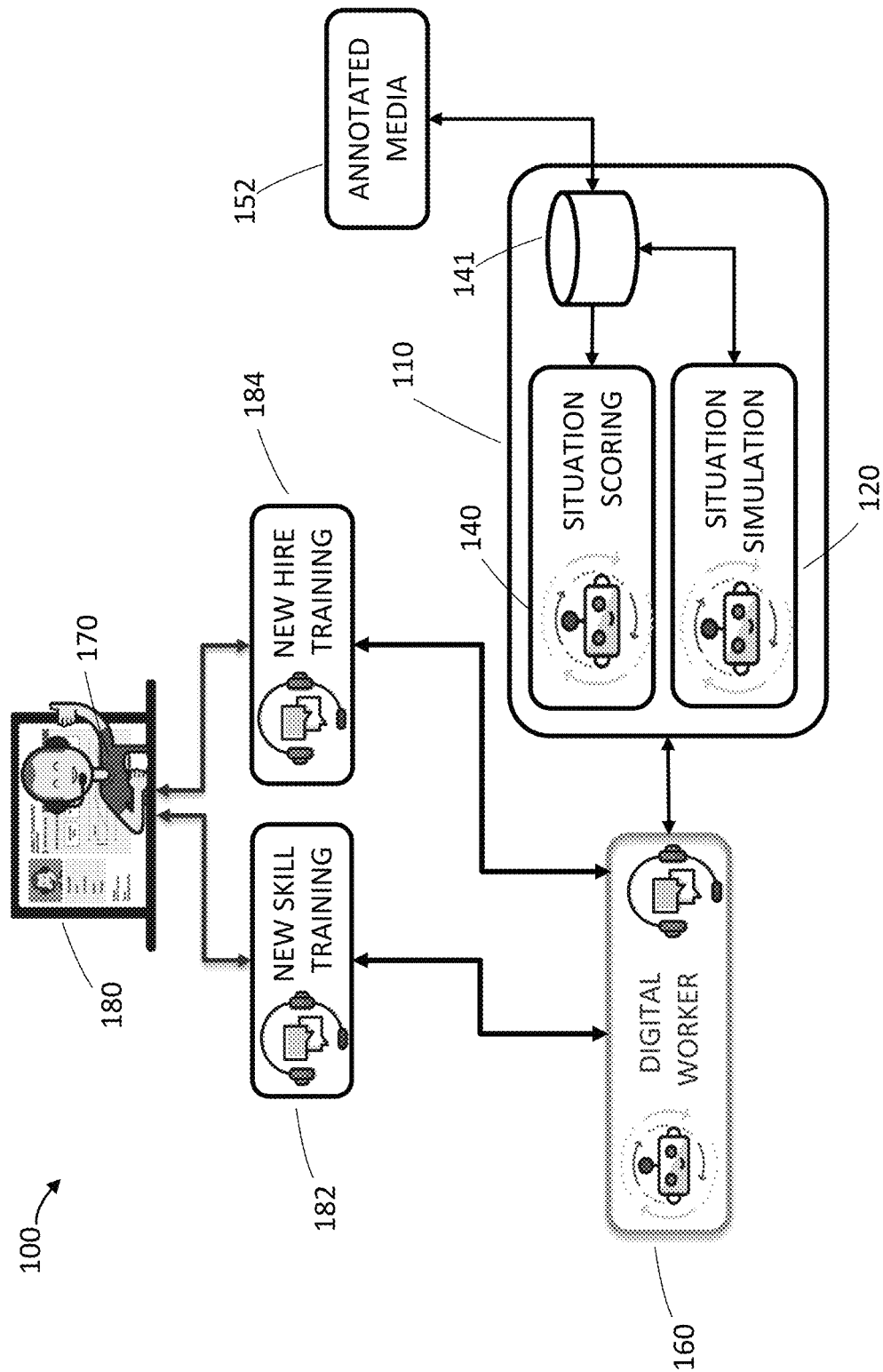
FIG. 1 is a schematic diagram of one embodiment of a customer service agent trainee system of the disclosure.
Figure 2:
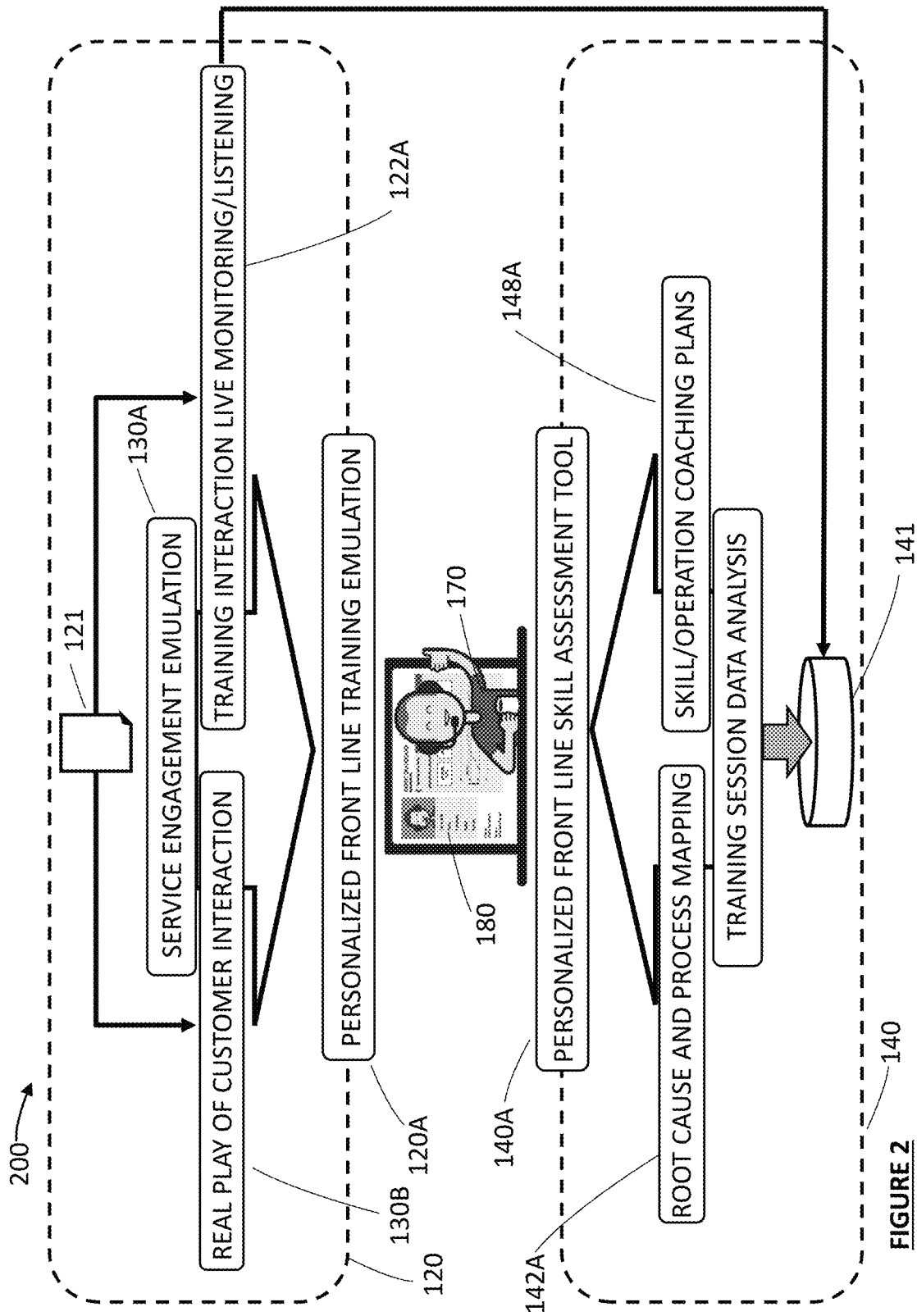
FIG. 2 is a schematic diagram of another embodiment of a customer service agent trainee system of the disclosure.
Figure 3:
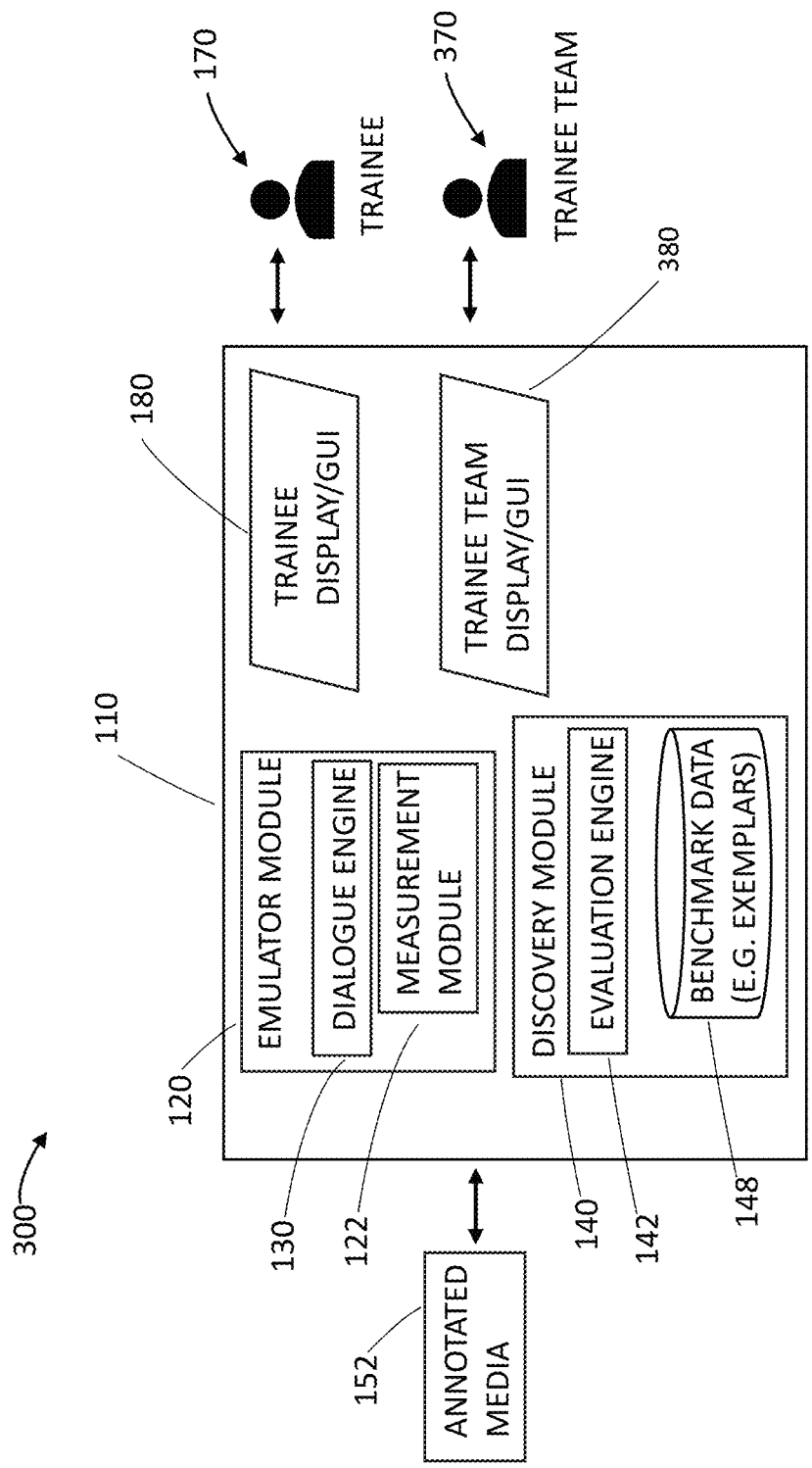
FIG. 3 is a schematic diagram of yet another embodiment of a customer service agent trainee system of the disclosure.
Figure 4:
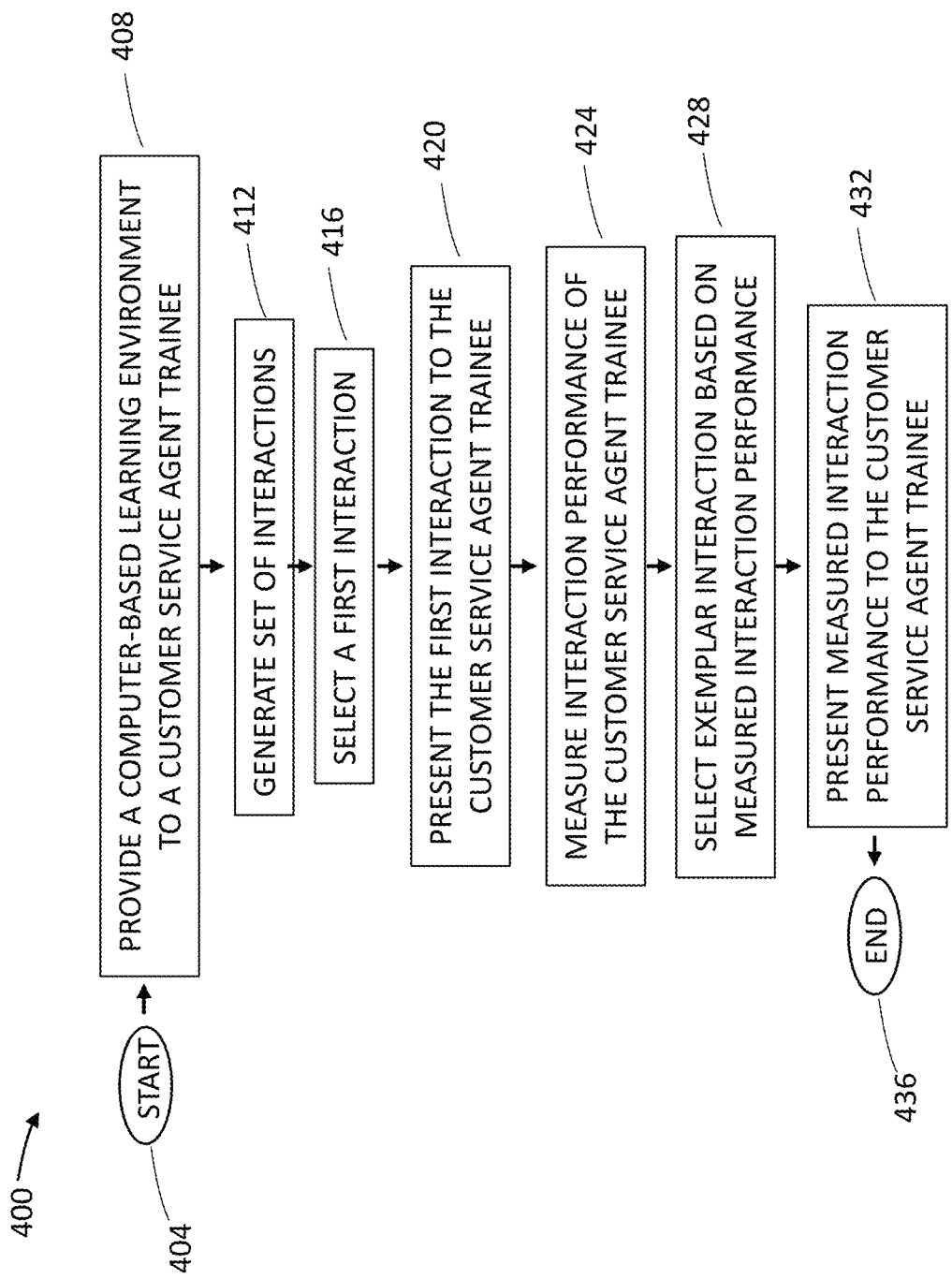
FIG. 4 is a flow chart of one method of use of the embodiment of a customer service agent trainee system of FIG. 3.
Figure 5:
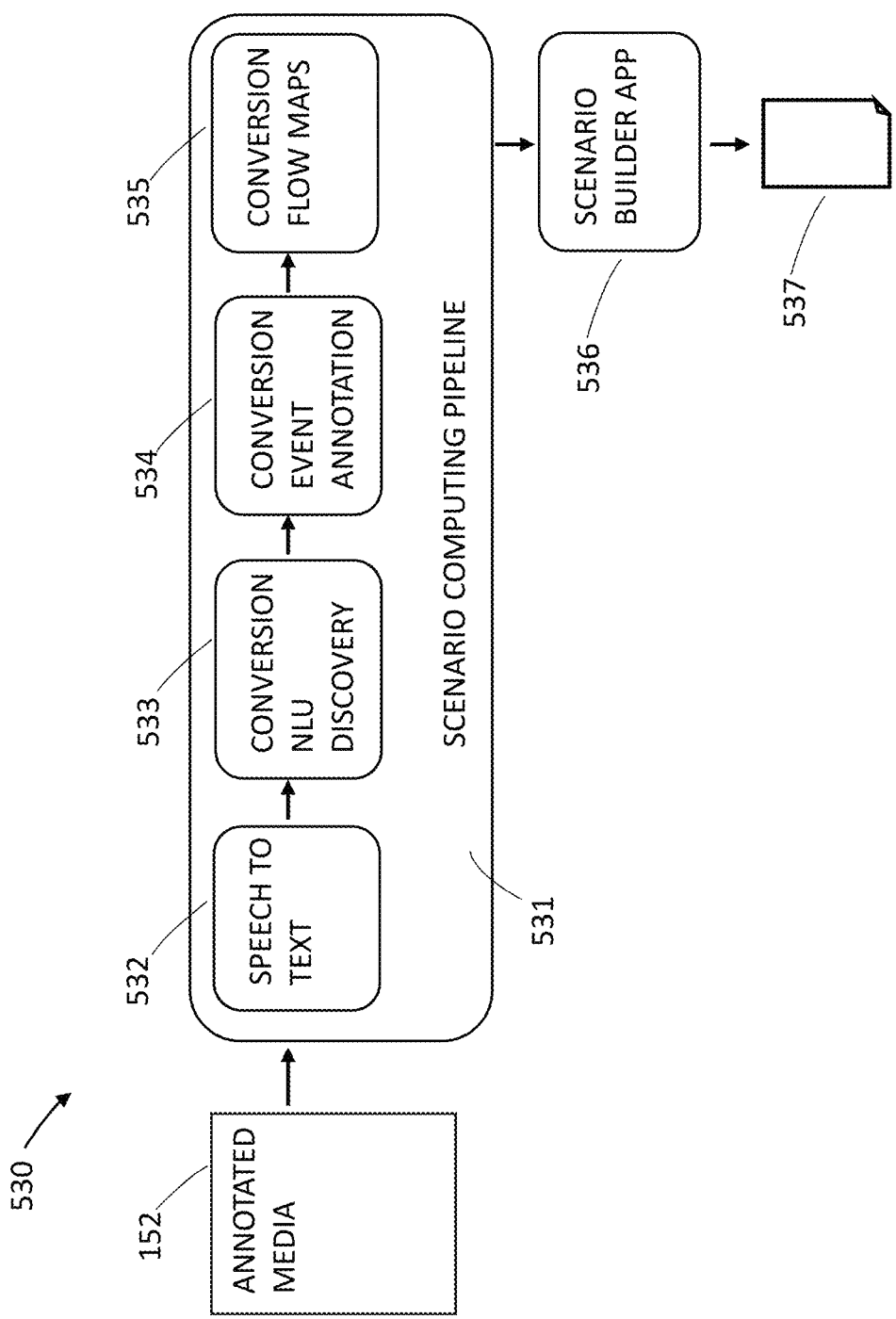
FIG. 5 is a detailed schematic diagram of one embodiment of the dialogue engine component of the embodiment of a customer service agent trainee system of FIG. 3.
Figure 6:
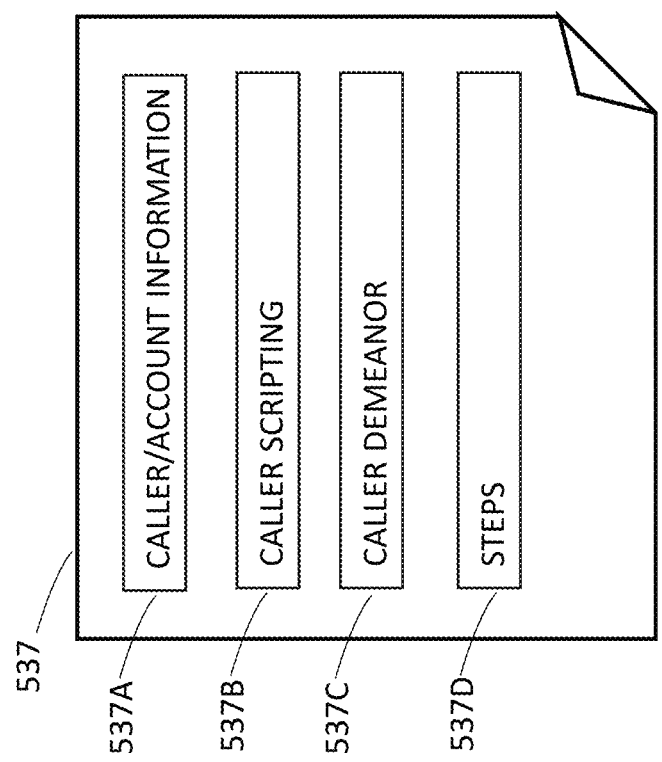
FIG. 6 is a detailed schematic flow diagram of one embodiment of the scenario builder app component of the embodiment of a dialogue engine of FIG. 5.
Figure 7:
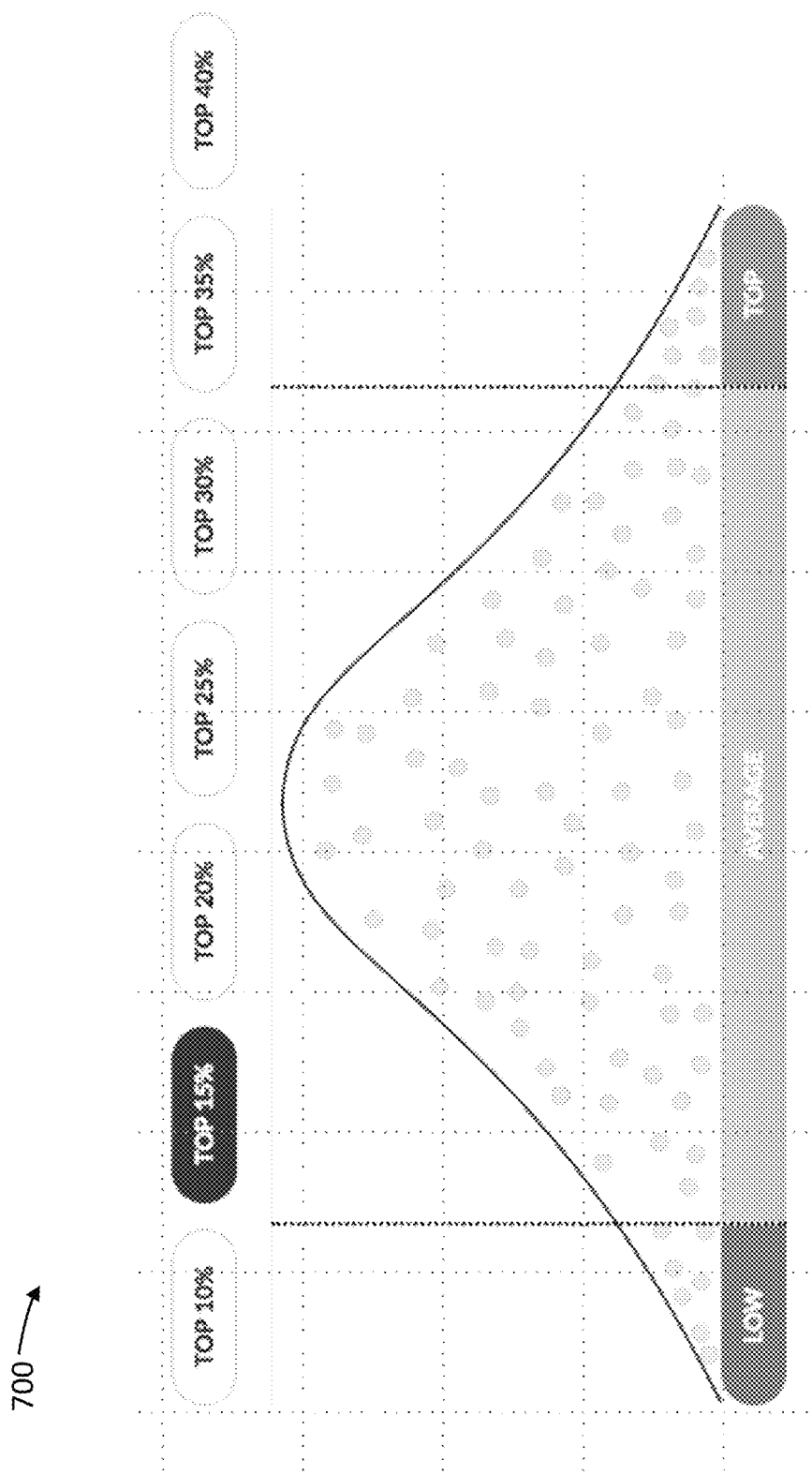
FIG. 7 is one embodiment of an example display/GUI element provided to a trainee team of the embodiment of a customer service agent trainee system of FIG. 3.

The customer service agent trainee system and the method of use of the customer service agent trainee will be described with respect to FIGS. 1-7. Generally, FIGS. 1-3 provide representations of similar embodiments of a customer service agent trainee system as schematic diagrams. FIG. 4 provides one embodiment of a method of use of the customer service agent trainee system of FIG. 3. FIGS. 5 and 6 depict additional details of the embodiment of the customer service agent trainee system of FIG. 3. FIG. 7 provides a one embodiment of an example display/GUI provided to a trainee team of the embodiment of the customer service agent trainee system of FIG. 3.

With attention to FIGS. 1-3, similar embodiments of a customer service agent trainee system 100, 200, 300 respectively are presented. Each of the set of FIGS. 1-3 provide a slightly different yet complementary perspective of a customer service agent trainee system and/or illuminate different elements or aspects of a customer service agent trainee system.

Generally, a customer service agent trainee 170 interacts with the simulated customer by way of a computer-based learning environment 180. One or more interactions between the customer service agent trainee 170 and the simulated customer are presented on the computer-based learning environment 180. In one embodiment, the simulated customer may be a digital worker 160, as depicted in the embodiment of FIG. 1.

In one embodiment, the computer-based learning environment is a portable electronic device, such as a laptop, smart phone, or desktop computer. In one embodiment, the customer service agent trainee 170 accesses and/or interacts with the computer-based learning environment 180 remotely, such as through cloud-computing.

The one or more interactions, sets of interactions, may reflect any of several types of training scenarios or training types, such as new skill training 182 and new hire training 184. Other training types known to those skilled in the art may be realized or implemented, such as rehabilitative skill training.

The customer service agent trainee system comprises a customer service agent trainee system platform 110, the customer service agent trainee platform 110 comprising an emulator module 120, an discovery module 130, a trainee display/GUI 180 (also termed a computer-based learning environment 180), and a customer service agent trainee/team display/GUI 370. The term "GUI" means a graphic user interface.

The emulator module 120 generates the set of interactions mentioned above between the customer service agent trainee and the simulated customer. The emulator module 120 also selects from the set of interactions one or more interactions, such as a first interaction, a second interaction, etc. The emulator module 120 bases the selection of a particular interaction on a number of factors, to include the performance of the customer service agent trainee 170, as will be discussed in more detail below. The emulator module 120 comprises a dialogue engine 130 and a measurement module 122. The dialogue engine 130 generally creates and drives simulated or emulated interactions between a customer service agent trainee 170 and a simulated customer. The measurement module 122 generally measures performance of the customer service agent trainee during emulated interactions.

The discovery module 140 measures interaction performance of the customer service agent trainee 170 with respect to benchmark data 148, such as benchmark data of exemplar customer service agent trainees and/or exemplar customer service agents. The discovery module 140 may also measure interaction performance of the customer service agent trainee 170 with respect to other customer service agent trainee 170. The discovery module 140 comprises an evaluation engine 142 and benchmark data 148. The evaluation engine 142 generally assesses the performance of a customer service agent trainee 170 as against selectable performance measures, such as benchmark data 148 obtained from high-performing aka exemplar customer service agents.

As an example, with attention to FIG. 3, a set of customer service agent trainees 170 may interact with the customer service agent trainee system 300. Each of the set of customer service agent trainees 170 interact with a customer service agent trainee display/GUI 180. The emulator module 120, by way of the dialogue engine 130, drives or creates a set of simulated interactions between each customer service agent trainee 170 and a simulated customer. The dialogue engine 130 selects the interaction to emulate based on performance of the customer service agent trainee 170. Stated another way, the dialogue engine adapts the selection of interaction based on feedback from the customer service agent trainee 170, such as performance measures of the customer service agent trainee 170. The measurement module 180 measures the performance of the customer service agent trainee 170 and provides the feedback required by the dialogue engine 130 to adapt or select the interactions. The customer service agent trainee 170, as recorded by the measurement module 122, are provided to or exchanged with the discovery module 140 and more specifically to the evaluation module 142 of the discovery module 140.

The discovery module 140 assesses performance data of the one or more customer service agent trainees 170, to include as against benchmark data 148. In some embodiments, the evaluation engine 142 of the discovery module 140 may, based on data provided by the measurement module 122, adjust settings or operations of the customer service agent trainee display/GUI 180 to focus on deficiencies of the customer service agent trainee 170. Such adjustments may be performed directly or by way of the emulator module 120. For example, the evaluation engine 142 may identify that a particular customer service agent trainee 170 is deficient in operations or scenarios that require interaction with a colleague worker (by way of the digital worker 160 as described in FIG. 1), and thus the customer service agent trainee display/GUI 180 and presented interactions may emphasize training aspects that develop or require interaction with the digital worker 160

In contrast, in a conventional process to train a single customer service agent trainee or a group of customer service agent trainees, the trainees attend a training class conducted by a trainer. The trainees may interact with one another under the supervision of the trainer. The training classes must remain no larger than twenty trainees to be effective. The training classes are typically held in person at a physical training site at set hours and dates. Trainees who cannot attend, due to e.g. scheduling conflicts or sickness, miss the training and generally have difficulty in making up for the training. It is common in such a situation to require the trainee to wait for the next scheduled training session, thus resulting in delay and increased costs in trainee training. After completing such initial training, the trainee graduates to working on "the floor," meaning the trainee may begin to interact with actual live customers who call in to the trainee for customer service support.

Once a customer service agent trainee is working the floor, i.e. has begun to handle live and actual calls from customers, Quality Assurance (QA) personnel typically select at random recorded interactions between the trainee and the customer. The selected calls are audited or evaluated for quality or effectiveness. The QA personnel typically assigns one or more scores to the randomly selected recorded interaction, creating a QA report on a QA form. Such scores and forms are manually completed by the QA personnel and must be calibrated among the set of QA personnel to ensure uniformity and fairness in scoring. The QA reports are sent by the QA personnel to supervisory personnel, such as a training supervisor.

Customer service agent trainee data collected and provided by QA personnel for a particular trainee or a group of trainees are accessed by the training team associated with the trainee or group of trainees. The training team may include a training supervisor 140 and a trainer 120. The training team may also include a coach that serves as an advocate or booster for a particular trainee or group of trainees (such as a particular trainee class.) The trainee supervisor is associated with or is the supervisor that the trainee actually reports, i.e. the training supervisor is the boss of the trainee. The trainer typically is chartered to train on a specific aspect of a skill or for a specific set of duties.

The training team read, interpret, and discuss the data and reports, such as QA reports, on particular trainees or groups of trainees to identify any training deficiencies and to suggest corrective actions to address the deficiencies. For example, a particular trainee may generally do well on most scored or appraised areas sampled, but routinely get flustered when dealing with customers who have financial questions that require the trainee to consult a colleague financial specialist (e.g. the customer has a specific billing or invoice concern.) The training team would discover such a deficiency and create a corrective action plan to address it, perhaps, e.g., to include additional training in such interaction scenarios by way of a particular trainer.

There are several challenges associated with the above-described typical or conventional approach to training trainees. In addition to the inefficacies described regarding limited volume (20 or fewer trainees) and fixed training schedules, the effectiveness of the training team discovering training deficiencies of trainees and creating and implementing corrective actions to address the training deficiencies is limited at best and ineffective at worst for several reasons.

The training team draws from data, obtained via the QA personnel, that only samples a very limited (e.g. 3%) of interactions of the trainee with customers. Such a small sample size will miss vast portions (indeed 97%) of potential trainee deficient interactions with customers. Also, once data is obtained by the training team, the assessment is limited is limited by available analytical tools. That is, the training team has very limited capability to determine if a trainee deficiency is trainee specific or associated with the entire training group (and thereby perhaps the deficiency is traced to the trainer and not the particular trainee).

One result of the challenges associated with typical training regimens is that the training team, e.g. training supervisors and training coaches, request additional one-on-one training time with trainees, which causes further inefficiencies in the training process. Another inefficiency result is a lack of standardization of corrective actions applied to particular trainee deficiencies, such that best practices may be applied when similar deficiencies are identified in other trainees. Generally, typical or conventional training systems and methods of training customer service trainees have no means of continuous measurement of coaching and training improvement monitors.

The systems and methods described in the disclosure address these and other challenges and problems of conventional training systems and methods of training customer service agents.

Returning to FIGS. 1-3, similar embodiments of a customer service agent trainee system 100, 200, 300 respectively are presented. Each of the set of FIGS. 1-3 provide a slightly different yet complementary perspective of a customer service agent trainee system and/or illuminate different elements or aspects of a customer service agent trainee system.

With particular attention to FIG. 3, the customer service agent trainee system 300 comprises a training system platform 110, the training system platform 110 comprising an emulator module 120 (aka emulator bot), a discovery module 140 (aka discovery bot), a trainee display/GUI 180, and a trainee team display/GUI 380. One or more customer service agent trainees 170 interact with the training system 300 by way of the trainee display/GUI 180. One or more of the trainer trainee team (see above description of trainee training team which may comprise, e.g. a trainer, QA personnel, and trainee supervisor) interact with the training system 300 by way of the trainee team display/GUI 380.

The training system platform 100 may be a physical platform comprising computer hardware, computer software, and the like, or may be a virtual platform. For example, the system platform 110 may comprise components that are "in the cloud" meaning generally that some elements may exist physically removed from others and are accessed through a computer network connection, such as by way of a data center.

Generally, the customer service emulator module 120 emulates or mocks or replicates interactions between a customer service agent trainee 170 and a simulated customer. The emulator module 120 provides a number of functions and capabilities. The emulator module 120 emulates a real engagement with a customer based on a variety of media such as voice recordings, chat transcripts, etc. The emulator module 120 also listens, monitors, and evaluates the training session with the customer service agent trainee 170. Furthermore, the emulator module 120 actively collects data for trainee skill evaluation and coaching computation, by way of the measurement module 122.

Several benefits to training of customer service agent trainees 170 result from the emulator module 120. For example, because the emulator module 120 is automated, the physical and time constraints of conventional training regimens are removed, thus allowing trainee learning at any time, at the pace of the individual trainee, and at essentially any place (subject to the ability to remotely access, by way of a network connection or other connection know to those skilled in the art, the emulator module 120.) Such training may be termed asynchronous learning.

The emulator module 120, through voice-enabled automation or so-called "voice-enabled bots" replicate the trainee engagement with a customer and provide immediate feedback, coaching, and performance results.

(Note that the term customer service agent trainee throughout the disclosure may also apply to customer service agents who have graduated from training and are no longer trainees but instead are employed customer service agents that have graduated from customer service training. Such employed customer service agents may engage the training system 300 for any of several purposes, to include new skill training, recurrent qualification evaluation, etc. Thus, the term trainee and the phrase "customer service agent trainee" are not limited to customer service agents that are trainees. Also, the phrase training system is not limited to training of customer service agent trainees, but rather may apply to interaction with a customer service agent of any status, to include an employed customer service agent that has graduated from customer service training.)

The customer service discovery module 140 provides automation to a training system to more effectively and efficiently train a customer service agent trainee 170 in customer support operations. The discovery module 140 provides a number of functions and capabilities. The discovery module 140 provides automated training session data analysis on both an individual customer service agent trainee 170 level and on a class of customer service agent trainees 170 (e.g. a particular trainee class) level. The discovery module 140 provides automated skill or operations coaching plans, e.g. automated corrective action plans to, for example, address training deficiencies of a particular customer service agent trainee 170. The discovery module 140 may also provide analysis capability to identify or pinpoint root causes of trainee deficiencies and process mapping to such root causes. Furthermore, the discovery module 140 may provide tools on a per customer service agent trainee 170 basis, i.e. personalized, skill assessment. (Note also that the discovery module 140 is not limited to use with customer service agent trainees, but instead, like the emulator module 120, may be used with customer service agent trainee of other-than-trainee status, such as employed and qualified customer service agents.)

The combination of the emulator module 120 and the discovery module 140, as part of the training system 300, yields many benefits. For example, the system 300 expedites the on-boarding program. The system 300 enables trainees 170 to train or to learn at a trainee-chosen speed and thus, overall, propel through training at accelerated speeds. In a scenario when the system 300 is used in concert with a traditional classroom training environment, a trainer, facilitator, and/or trainee team 370 is then given the freedom to work more closely with the customer service agent trainees that are of lower performance, i.e. the trainer team 370 may focus more on the medium to low performers. Other benefits include asynchronous (i.e. anytime) training, lowered costs to facilitate training, improved operational speed to proficiency, and reduced need for trainers, facilitators, and support staff, as described above.

With particular attention to FIG. 1, a customer service agent trainee 170 is depicted engaging with a particular mode of trainee display/GUI 180 of the system 100, namely a display that mocks the display/GUI that a trainee would actually use "on the floor" meaning in an actual role as a customer service agent. Such a mode of operation is termed a "real play sandbox mode."

The customer service agent trainee 170 is depicted in communication with digital worker 160. The digital worker 160 mocks a colleague that the customer service agent trainee 170 may interact as needed. For example, a training scenario may require a customer service agent trainee 170 to contact or confer with a colleague specialist, such as a financial or budget specialist, when addressing the needs of the simulated or emulated customer.

The customer service agent trainee system platform 110 provides a training modality selector function for the training of the customer service agent trainee 170. The selection may be with respect to type or mode of training, such as new hire training 184 or new skill training 182. Other modes are possible, such as recruiting, on-boarding, and production.

With respect to the recruiting or the onboarding modality, capabilities or functionalities available of the customer service agent trainee system 100 may include: AI-assisted sourcing and recruiting, omnichannel recruitment, Bot-assisted application process, 24/7 push notifications, scheduling & appointment reminders, application status tracker, competency assessment, skills development, professional and management appraisal, sales skills development, and job candidate assessment.

With respect to the production modality, capabilities or functionalities available of the system 100 may include: real-time assistance, Bot-assisted IT and HR support, communication and follow-up with agents, Bot assistance to team leaders or trainee team to analyze performance reports and prioritize tasks, Bot-generated reminders and follow-ups for team leaders or trainee team to take action, and Bot-serviced or Bot-assisted customer demand.

The customer service agent trainee system platform 110 may also provide selection of the trainee environment, such as classroom, home, or brick and mortar service workstation environment. The system platform 110 may also provide or enable selection of media between the customer service agent trainee 170 and the customer service agent trainee display/GUI 180, e.g. an emulation of the production customer service agent interface. For example, the emulation of the production customer service agent interface may provide a selection of a text-based simulated interaction with a customer to include chat-based interaction, voice-based interaction, and/or video-based interaction.

In one embodiment, the customer service agent trainee system 300 is configured to operate without engagement or interaction with the discovery module 140.

With particular attention to FIG. 2, another schematic diagram of an embodiment of a customer service agent trainee system 200 is depicted. A customer service agent trainee 170 is depicted interacting with each of the emulator module 120 (as depicted above the customer service agent trainee 170) and discovery module 140 (as depicted below the customer service agent trainee 170).

Generally, the emulator module 120 interacts with training scenario cards 121 and other scenario data, such as voice recordings and chat transcripts, derived or based on actual interactions between, e.g. call center agents and customers, to produce an AI or intelligent system-based personalized front-line training emulation. The emulator module 120 is enabled by components that parse utterances of the trainee and/or the customer during interactions to produce signals, such as digital signals.

Simultaneously, the discovery module 140 (as depicted below the customer service agent trainee 170), provides a personalized front-line skill assessment tool as based on, for example, root cause and process mapping, skill/operation coaching plans, and training session data analysis. Data associated with the training session is stored in a system event recording database 141.

As mentioned, the customer service agent trainee 170 interacts or engages with a customer service agent trainee display/GUI 180. The customer service agent trainee display/GUI 180, as driven by the emulator module 120 and in particular by the dialogue engine 130 of the emulator module 120, may comprise one or both of voice dialog and chat dialog with respect to an emulated or simulated customer. The customer service agent trainee GUI/display 180 may mock or simulate an "on the floor" customer service agent display. Stated another way, the customer service agent trainee display 180 may emulate a production customer service agent display/GUI. The voice and message channels that drive the respective voice dialog and chat dialog UI (user interface) are generated by the chat conversation emulator service module (the emulator module 120). The emulator module 120 may be configured by a managed service setup and configuration module or component.

The training scenarios presented to the customer service agent trainee 170 may be created by a training content developer. The training content developer uses one or more of a scenario builder app, emulator app, and conversation classification service to create training content. The term "app" means . . . An AI or intelligent systems-based module termed a conversation service may interact with the emulator app, and an AI or intelligent systems-based module engagement mining service may interact with the RP conversation classification service. Specific data for a particular user of the customer service agent trainee system provides a set of one or more of voice recordings, chat transcripts, job aids, scenario cards, and/or document store data that forms the basis for the emulated scenarios.

A customer service agent trainee team member or members 180 interacts with, among other things, a conversation editor, which may enable, for example, specialized or personalized training scenarios or events to be presented to a particular customer service agent trainee 170. The event recording database 141 may interact with a service desktop recorder managed service and/or the intelligent systems-based discovery services module 140. A service desktop recorder may manage service records data associated with the interaction between the customer service agent trainee 170 and the simulated customer.

The emulator module 120 of a customer service agent trainee system provides data-driven, personalized training to a customer service agent trainee 170. The data used by the emulator module 120 comprises annotated media 152 of one or more types. The annotated media 152 is processed through a set of steps. The annotated media 152 may first be ingested by the emulator module 120. The annotated media 152 may comprise email, customer relationship management (CRM) data, survey data, chat transcripts or other associated data, audio transcripts or other associated data, video transcripts or other associated data, and "real play data" (i.e. trainee interactions with the real play sandbox of an on-the-floor system.) Other data relevant to training of a customer service agent trainee 170 and/or relevant to interactions between a customer service agent trainee and a simulated customer, as known to those skilled in the art, may also be received The annotated data 152, as ingested into the emulator module 120, is then synthesized.

The data synthesis by the emulator module 120 of the annotated data 152 may span alignment of time or event stamps of the data through to data analysis of several data types which, together, yield information as to the training performance or capabilities of the customer service agent trainee 170. The synthesized data is then presented to the one or more members of the customer service agent trainee team 370 via the customer service agent trainee team display/GUI 380. An example such display is provided as FIG. 7.

Through interaction with one or more customer service agent trainee team display/GUI 380, the conduct or interaction of the customer service agent trainee 170 against a particular and selected emulated scenario (and/or a selected interaction as selected from a set of interactions) may be evaluated, and suggestions or actions may be created to assist or coach the customer service agent trainee 170 in reaching a level of proficiency of an exemplar or model customer service agent trainee (e.g. a customer service agent trainee of the highest quality.) Thus, the coaching that is provided to the customer service agent trainee 170 is personalized and data-driven (by the data collected with respect to the scenario presented). The coaching is also much more immediate, rather than substantially delayed due to sampling delay of the traditional process (as described above) involving sampling by QA personnel and caucusing between various training team members.

In one embodiment, one or more of the actions, such as the processing steps of the annotated data 152 by the emulator module 120, is performed automatically without human interaction.

Returning to FIG. 1, the customer service agent trainee system 100 depicts the emulator module 120 (which provides, among other things, situation simulation of the customer service agent trainee 170 interacting with a simulated customer), the discovery module 140 (which provides, among other things, situation scoring of the customer service agent trainee 170 interacting with a simulated customer), each of the emulator module 120 and discovery module 140 interacting with the event recording database 141.

The annotated media 152 of one or more types (as described above) may be received or processed or ingested by way of a system cloud. Note that the annotated media 152 may comprise email, customer relationship management (CRM) data, survey data, chat transcripts or other associated data, audio transcripts or other associated data, video transcripts or other associated data, digital worker transcripts or other associated data, QA data, and real play data (i.e. trainee interactions with a production aka on-the-floor system.) Among other things, the system cloud comprises APIs (application programming interfaces) for each of the annotated media 152. For example, the system cloud may comprise an API to receive or to ingest video data.

The system cloud may interact with the event recording database 141 and provides the event recording database 141 with synthesized annotated media data 152. The system cloud interaction with the event recording database 152 may provide data that enables the AI or machine learning engines of the customer service agent trainee system 100 to continuously improve simulation engines (of the emulator module 120) and scoring engines (of the discovery module 140).

The event recording database 141 may receive unified or aggregated data from a training corpus. The training corpus combines, synthesizes, and/or aggregates data from a plurality of sources and types. The training corpus provides a knowledge ontology to organize learning to feed the simulation and scoring engines of the respective emulator module 120 and discovery module 140. The training corpus largely, or completely, performs the combination, synthesis, or aggregation of the data sources and types automatically. Such a process is traditional performed by a human. The training corpus may include the following types of data, modules, or models: knowledge databases, curated content, harmonized metadata, domain models, content models, analytics programs, quality data, and governance models.

Each of the customer service agent trainee system platform 110 and the event recording database 141 may interact with a gamified digital learning module. The gamified digital learning module provides an incentive for customer service agent trainee 170 learning by constructing a competitive gaming atmosphere among customer service agent trainees. More specifically, a plurality of customer service agent trainees is assigned scores based on their performance or competency in completing training aspects or elements or skills associated with a particular training regimen (for example, the new skill training 182 and new hire training 184.)

With attention to FIG. 2, an alternate embodiment of a customer service agent trainee system 200 is depicted. The system 200 comprises the emulator module 120 and the discovery module 140, each interacting with a customer service agent trainee 170 by way of a customer service agent trainee display/GUI 180.

The emulator module 120 provides personalized frontline training 120A, as generated by components of the dialogue engine: the real play of (simulated) customer interaction 130B, and the service engagement emulation 130A. The performance of the customer service agent trainee 170 is measured by the training interaction live monitoring/listening 122A component of the emulator module 120.

The discovery module 140 provides a personalized frontline skill assessment tool 140A, and a root cause and process mapping 142A function. The root cause and process mapping 142A may comprise data analysis and synthesis of customer service agent trainee 170 performance to determine likely or potential causes of training difficulties or challenges for a particular single or set of customer service agent trainees 170. The skill/operation coaching plans 148A may leverage benchmark data 148 of exemplar customer service agents to select particular coaching plans. A training session data analysis 142B component provides analysis of performance of a single or a set of customer service agent trainees 170 and provides data to the event recording database 141. The event recording database 141 also receives data from the training interaction live monitoring/listening 122A module.

FIG. 4 is a flow chart of one method of use of the embodiment of a customer service agent trainee system 300 of FIG. 3. In one embodiment of a method of use, the customer service agent trainee system 300 may operate in the sequence of steps described on FIG. 4. Other methods of use are possible, to include a sequence of steps different than those of FIG. 4, a sequence with additional steps, and a sequence with fewer steps. Also, elements of the customer service agent trainee system 100 of FIG. 1, the customer service agent trainee system 200 of FIG. 2, and/or other aspects of a customer service agent trainee system as described in this disclosure, may be incorporated.

With particular attention to FIG. 4, a flowchart of a method 400 to train a customer service agent trainee is provided, the method 400 utilizing the elements described in the systems 100, 200, and 300 of FIGS. 1-3, respectively. Reference will be made to FIGS. 1-3 and to the description of FIGS. 1-3.

The method 400 starts at step 404 and ends at step 436. Any of the steps, functions, and operations discussed herein can be performed continuously and automatically. In some embodiments, one or more of the steps of the method 400 may comprise computer control, use of computer processors, and/or some level of automation. The steps are notionally followed in increasing numerical sequence, although, in some embodiments, some steps may be omitted, some steps added, and the steps may follow other than increasing numerical order.

At step 408, a computer-based learning environment is provided to a customer service agent trainee 170. The computer-based training environment may be the customer service agent trainee display/GUI 180 as described above or otherwise in the disclosure. The training environment may be remotely accessed by the customer service agent trainee 170. The training environment may substantial mock or replicate the environment of an actual on-the-floor customer service environment, i.e. the "real play" environment described in the disclosure. After completing step 408, the method 400 continues to step 412.

At step 412, a set of interactions between the customer service agent trainee 170 and simulated customer are generated. The set of interactions are generated by the emulator module, and more specifically by the dialogue engine 130 of the emulator module 120. Further details of the generation of the set of interactions is provided, for example, with respect to FIGS. 5 and 6, as described below. At the completion of step 412, the method continues to step 416.

At step 416, a first interaction is selected from the set of interactions. The first interaction may be randomly selected or may be selected in a deliberate way. For example, a customer service agent trainee 170 may request a particular type of interaction (e.g. perhaps focused on financial matters), because the customer service agent trainee 170 is aware that he/she is deficient in that area. Similarly, a customer service agent trainee team member, e.g. a supervisor, may select or skew the selection of interaction to focus on an area that he/she believe the customer service agent trainee 170 needs further training. At the completion of step 416, the method continues to step 420.

At step 420, a first interaction is presented to the customer service agent trainee 170 by way of the customer service agent trainee display/GUI. The first interaction is generated by the dialogue engine 130 as enabled by the annotated media 152. At the completion of step 420, the method 400 continues to step 424.

At step 424, the measurement module 122 measures the performance of the customer service agent trainee 170 in executing the selected first interaction. The measurements may include absolute numerical measurements (e.g. time to respond to a simulated customer query), qualitative measures (e.g. facial recognition measures or impressions of the customer service agent trainee), and relative measures of the performance of the customer service agent trainee as against exemplar or benchmark data. AT the completion of step 424, the method 400 continues to step 428.

At step 428, an exemplar interaction is selected as based at least partially on the measured performance of the customer service agent trainee 170. The exemplar interaction may be presented to the customer service agent trainee 170 on the customer service agent trainee display/GUI 180. At the completion of step 428, the method continues to step 432.

At step 432, one or more measures of the performance of the customer service agent trainee 170 are presented to the customer service agent trainee 170. The presentation may be provided in any of several formats, as discussed below. The measures of the performance of the customer service agent trainee 170 may also be provided to the discovery module 140, which may integrate the measured performance against other customer service agent trainees 170 and/or performance targets set by a supervisor trainer or other customer service agent trainee team member. At the completion of step 432, the method 400 continues to step 436 and ends.

FIG. 5 is a detailed schematic diagram of one embodiment of the dialogue engine 530 component of the embodiment of a customer service agent trainee system of FIG. 3. More specifically, FIG. 5 provides further detail as to the engine or mechanics of generating and executing the emulation of a customer interaction by the emulator module 120. A scenario computing pipeline 531 is depicted, wherein annotated media 152 are used to generate simulated sets of interactions to present to a customer service agent trainee 170. The scenario computing pipeline 531 generally receives annotated media 152 (as described above) and, through a series of steps, provides output to a scenario builder app 536 such that scenario cards 121 may be created. The scenario cards 121 are used to drive the training emulation scenarios presented by the emulator module 120, and to help to define one or more sets of interactions presented to a customer service agent trainee 170 by way of a customer service agent trainee display/GUI 180

The scenario computing pipeline 531 comprises a speech to text module 532, a conversation NLU discovery module 533, a conversation event annotation module 534, and a conversation flow map module 458. The term "NLU" means natural language understanding and is defined as a branch of AI that uses computer software to understand input made in the form of sentences in text or speech format.

The speech to text module 532 receives annotated media 152 data input and creates sets of text data. The text data may comprise utterances derived from the annotated media 152 data. For example, the speech to text module 532 may create utterances or alter utterances received. Furthermore, the speech to text module 532 may add context to utterances, such as combining or synthesizing the data received. For example, the speech to text module 532 may combine related emails to a particular audio data stream (such as an email sent to the customer service agent trainee 170 by a customer prior to that customer calling the customer service agent trainee 170.) The output of the speech to text module 532 is provided to the conversation NLU discovery module 533.

The conversation NLU discovery module 533 aggregates the text data provided by the speech to text module 532 and data received directly from the annotated media 152 data stream. The conversation NLU discovery module 533 may comprise a scenario conversation module to perform the aggregation. The conversation NLU discovery module 533 outputs data to the conversation event annotation module 534.

The conversation event annotation module 456 decomposes a conversational transcript into component structure and features. The decomposition of the conversational transcript is performed by annotating the transcript and then by clustering utterances. The annotation of transcripts comprises trimming extraneous content, breaking up transcripts into events, tagging variables (entities/slots), and tagging good skill behaviors and bad or poor skill behaviors. The clustering of utterances is performed by predicting utterance matches, collecting votes on predictions, processing votes, and building clusters. The process of decomposing a conversational transcript into component structure and features may employ a scenario entity model. The scenario entity model constructs a scenario entity graph comprising scenario entity synonyms. The output of the conversation event annotation module 534 is provided to the conversation flow maps module 535.

The conversation flow maps module 535 refines features identified or discovered by the conversation event annotation module 534 and trains conversation flow models. (In one embodiment the conversation flow models trained are the scenario conversation models.) The features identified or discovered by the conversation event annotation module 534 are refined by the conversation flow map module 535 to, among other things, predict weak intents, fortify weak intents, and select best line(s) from each cluster. The conversation flow maps module 535 also trains the conversation flow models; in one embodiment, the conversation flow models are RNN models. The term "RNN" and "recurrent neural network" means a type of advanced artificial neural network (ANN) that involves directed cycles in memory. One aspect of recurrent neural networks is the ability to build on earlier types of networks with fixed-size input vectors and output vectors.

In one embodiment of a scenario ontology of the conversation flow maps module 535, a scenario conversational graph is constructed that, among other things, identifies repetitive conversational events among scenario conversational events and scenario entity synonyms.

The output of the conversation flow maps module 535 is provided to the scenario builder app 536.

The scenario builder app 536 receives data from the conversation flow maps module 535 which enables one or more scenario cards 537 to be created. The scenario cards 537 are used to drive the training emulation scenarios presented by the emulator module 120. More specifically, the scenario cards 537 are used by the AI or intelligent systems engine of the emulator module 120 to emulate a customer during training scenarios with a customer service agent trainee 170

One simplified embodiment of a scenario card 537, as created by the scenario builder app 536, is depicted in FIG. 6. The scenario card 537 comprises an intelligent virtual assistant (IVA) that may perform one or more of several functions. The IVA loads emulated personal data entities 537A into the short term (computer) memory of the customer service agent trainee system. The IVA may then randomly select from a collection of initial phrases (from "caller scripting" portions 537B of the scenario card 537) to begin inquires to the trainee 110. The IVA then selects a caller demeanor 537C to invoke for the training session, such as "concerned." Thus, the IVA creates an emulated customer persona. The IVA reflects the selected (emulated) customer demeanor to drive the tone of the emulated conversation with the customer service agent trainee 170 and to organize conversational dialogue content. The IVA also listens or monitors for advisement from the trainee 110 and may introduce additional dialogue (such as additional advisement dialogue) which may be influenced by the selected customer persona. The IVA listens or monitors for acceptable or proper engagement of the customer service agent trainee 170 with the emulated customer, such engagement data recorded for use by the customer training system 100 (in particular, for use by the discovery module 140).

For example, in a scenario in which financial data are involved, the financial data may reference PCI parameters. The term "PCI" and "payment card industry" refers to a financial industry security standard, i.e. the PCI data security standard. In such a scenario, the scenario card 537 model would interact with PCI parameters when requested by the emulated or simulated customer, and/or for the customer service agent trainee 170 to interact with a digital worker 160. In one embodiment, a sentiment analysis may be an embedded element or function of the interaction between the customer service agent trainee 170 and the emulated customer, such that interactions (e.g. dialogue) between the two is influenced by the sentiment measured.

FIG. 7 is one embodiment of an example display/GUI element provided to a customer service agent trainee team 370 team of the embodiment of a customer service agent trainee system of FIG. 3.

Various displays/GUIs may be provided to one or both of the customer service agent trainee 170 and members of the customer service agent trainee team 370. For example, an integrated balanced scorecard display may present weighted and other data in a dashboard format. An integrated incentive, commissions, badges, and points display may provide a visual (i.e. analog) portrait of one or more of incentives, commissions, badges, and points, thereby ensuring that earnings and earnings potential are always top of mind for a customer service agent trainee 170. A leaderboard display may provide rankings against other trainees with respect to any metrics. In one embodiment, elements of the leaderboard display may be broadcast to company displays (e.g. by Chromecast) to encourage or stimulate competition and community. In one aspect, a gamified digital learning module provides an incentive for customer service agent trainee 170 learning by constructing a competitive gaming atmosphere among trainees. More specifically, a plurality of trainees is assigned scores, or metrics, based on their performance or competency in completing training aspects or elements or skills associated with a particular training regimen (for example, the new skill training 182 and new hire training 184.)

The customer service agent trainee training team 370 may include a training supervisor, a trainer, and/or QA personnel. The training team may also include a coach that serves as an advocate or booster for a particular customer service agent trainee 170 or group of trainees 170 (such as a particular trainee class.)

For example, a customer service agent trainee display/GUI 180 (aka dashboard) used by a customer service agent trainee 170 may comprise an MTD (month to date) Goal/Actual status by KPI portion, with 5-month trend, balanced scorecard and integrated incentives. The term "KPI" means key performance indicator, e.g. any performance metric designated as of primary importance. The customer service agent trainee display/GUI 180 may also present current coaching commitments, due date, and progress indicator. Also, the customer service agent trainee display/GUI 180 may present learning tasks based on relevancy to poor performance areas (or as assigned.) Also, the customer service agent trainee display/GUI 180 may present gamification aspects, such as badges, leaderboard performance, and incentives earned.

As another example, a customer service agent trainee team display/GUI 380 (aka dashboard) used by a training team supervisor may present a "my team" portion, my team portion presenting MTD Goal/Actual status for overall team, per KPI, with 5-month trend and team rank per KPI. The customer service agent trainee team display/GUI 380 may also present performance treads, such as each customer service agent trainee 170 performance by KPI and color-coded by status. Furthermore, the customer service agent trainee team display/GUI 380 may present coaching comparison data, such as coaching quality, coaching effectiveness percentage, and rankings per supervisor. Lastly, the customer service agent trainee team display/GUI 380 may present a task manager which provides auto-generated coaching, recognition, follow-up, survey, and quality tasks.

Furthermore, a particular display/GUI feature of one embodiment of a customer service agent trainee team display/GUI 380 may reference a "top performer" persona. The top performer persona may be set at an upper percentage of performance, such as the top 15% as presented in FIG. 7. The top performer persona allows a customer service agent trainee training supervisor to set a top performer persona percentage to gain insight and profile into the highest performing trainees, and thus drive the actions to all other agents to replicate their behaviors.

A customer service agent trainee team display/GUI 380 (aka dashboard) may comprise a coaching magic quadrant providing an executive performance matrix offering a perspective on relative performance of trainee coaches and trainee improvement. More specifically, the coaching magic quadrant presents or identifies the performance of trainees against the number of coaching sessions or interactions. The matrix identifies coaching with agents improving or not improving, and those not coaching with agents improving and not improving.

In one embodiment of a trainee team display/GUI 380, a coaching form display provides a map to the coach's metrics, behaviors, sub-behaviors, root causes and any other requirements. The display captures commitments and due dates; workflow then monitors progress and triggers follow-up or recognition tasks. Such a display may power the coach's effectiveness ratings. Also, the display may present a coaching history. For example, the display may present an option to view all previous coaching for selected agent, as tagged with metrics, behaviors, and causes, and visual ques with respect to trainee improvement post coaching. In one embodiment, the coaching is not presented to a customer service agent trainee 170 by a human, but instead by the discovery module 140.

In another embodiment of a customer service agent trainee team display/GUI 380 used by a training coach (or any of the training team), a set of recommended best practices to impart to the customer service agent trainee 170 are presented. The best practices may be culled from best performers (as identified and determined per above descriptions) and may include content such as video animation of an actual call with trainer overlay. The best practices may be tied to metrics, behaviors, and root causes—any or all of which are assigned by a root causes engine. Further, best practices micro-learnings may be presented to the customer service agent trainee 170 directly or via a coach. Such best practices micro-learnings may include short (e.g. 2-3 minute) video and animation trainings targeting a single precise skill that may be quickly consumed and immediately used. In one embodiment, the best practices are recommended to managers for coaching and to agents directly on the agent (i.e. the customer service agent trainee 170) display/GUI 180.

A customer service agent trainee team display/GUI 380 may include gauges for the varying motivations of diverse workforces to target programs at different generations and skill levels.

In one embodiment of a customer service agent trainee system, a learning management system (LMS) is in communication with the one or more members of the customer service agent trainee training team 370. An LMS is a system for the administration, documentation, tracking, reporting and delivery of educational courses or training programs. In one embodiment, the LMS is an off the shelf or commercial system.

In one embodiment of a customer service agent trainee system, a customer service agent trainee 170 emotions are scored and measured. Generally, it is possible to predict future employee behaviour based on emotions. One important metric is a multi-dimensional score that indicates the likely current emotional state of every employee in a work force. Such a score may be deemed an "Employee eXperience Vector" or an EXV.

The EXV combines data science (segmentation, predictive modelling, etc.) with behavioural science (analysis of feelings, perceptions, etc.). The solution converts fleeting emotions into persistent, long term emotion maps (sets of numbers) that summarises each employee's unique journey from recruitment to retirement. The approach is not dependent upon surveying each employee and extrapolates experiences across employee journeys and business events. Because the solution is not dependent upon survey scoring, it can be used to generate EXV scores for the whole workforce and in near real-time. Also, the solution operates at scale (for every employee), automatically and frequently (every day) and gives a simple-to use score that can be embedded within operational systems (such as Human Capital Management, Learning/Career Management, Resource Planning, etc.)

The above embodiments may, in combination or separately, may utilize computer software and/or computer hardware (to include, for example, computer-readable mediums) for any of several functions such as automated control or measurement or sensing, and furthermore may utilize one or more graphical user interfaces for human interaction with modules or elements or components.

The exemplary systems and methods of this disclosure have been described in relation to customer service agent training. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system to train an agent trainee user, the system comprising:
   a user interface configured to interact with an agent trainee user and operating to receive a set of annotated media and to receive a set of agent trainee user responses to a set of training interactions;
   a data storage device having a non-transitory computer-readable storage medium, the data storage device storing a set of benchmark training data comprising a set of exemplar user training interactions associated with a particular user interaction performance measurement; and
   a computer processor having machine-executable instructions operating to:
   generate a first training interaction between the agent trainee and a simulated customer;
   receive a first set of agent trainee user responses to the first training interaction;
   measure an agent trainee user interaction performance measurement of the agent trainee user associated with the first training interaction;
   select, based at least on the agent trainee user interaction performance measurement, an exemplar user training interaction associated with the agent trainee user interaction performance measurement; and
   present the exemplar user training interaction to the agent trainee user on the user interface.

2. The system of claim 1, wherein the simulated customer is selected from a set of simulated customers.

3. The system of claim 1, wherein the first training interactions is associated with at least one of a set of audio files and a set of video files.

4. The system of claim 1, wherein the first training interaction comprises at least one of text interactions and voice interactions.

5. The system of claim 1, wherein the first training interactions comprises a set of dialogues.

6. The system of claim 1, wherein the agent trainee user is a customer service agent trainee user.

7. An agent trainee system comprising:
   a trainee user interface operating to receive, from a trainee user, a set of trainee user responses to a set of trainee interactions;
   a data storage device comprising a non-transitory computer-readable storage medium, the data storage device storing a set of exemplar trainee interactions associated with a set of trainee interaction performance measurements;
   a computer processor comprising a logic engine having machine-executable instructions operating to:
   receive a set of media inputs;
   generate a trainee first interaction associated with the set of media inputs;
   present the trainee first interaction to the trainee user on the trainee user interface;
   receive a first set of trainee user responses to the trainee first interaction;
   measure a trainee first interaction performance measurement;
   search the set of exemplar trainee interactions based on the trainee first interaction performance measurement to identify a first exemplar trainee interaction; and
   present the first exemplar trainee interaction to the trainee user on the trainee user interface.

8. The system of claim 7, wherein the set of trainee interactions are associated with new hire training.

9. The system of claim 7, wherein the first interaction performance measurement is provided to a supervisory trainer.

10. The system of claim 7, wherein the set of media inputs comprise at least one of a voice input and a text input.

11. The system of claim 7, wherein the trainee first interaction performance measurement comprises a measurement of a time for the trainee user to respond to a query associated with the trainee first interaction.

12. The system of claim 7, wherein the trainee first interaction performance measurement comprises a facial recognition measurement of the trainee user.

13. A method of training an agent trainee, comprising:
   providing an agent trainee system comprising:
   a trainee user interface operating to receive, from a trainee user, a set of trainee user responses to a set of trainee interactions;
   a data storage device comprising a non-transitory computer-readable storage medium, the data storage device storing a set of exemplar trainee interactions associated with a set of trainee interaction performance measurements; and
   a computer processor comprising a logic engine, the logic engine operating to:
   receive a set of media inputs;
   generate a trainee first interaction associated with the set of media inputs;
   present the trainee first interaction to the trainee user on the trainee user interface;
   receive a first set of trainee user responses to the trainee first interaction;
   measure a trainee first interaction performance measurement;
   search the set of exemplar trainee interactions based on the trainee first interaction performance measurement to identify a first exemplar trainee interaction; and
   present the first exemplar trainee interaction to the trainee user on the trainee user interface.

14. The method of claim 13, wherein the logic engine further operating to annotate the set of media inputs to create a set of annotated media inputs, the first interaction associated with the set of annotated media inputs.

15. The method of claim 13, wherein the set of media inputs comprises at least one of a text input and a voice input.

16. The method of claim 13, wherein the first trainee interaction comprises a set of dialogues.

17. The method of claim 13, wherein the agent trainee is a customer service agent trainee.

18. The method of claim 13, wherein the trainee first interaction performance measurement comprises a measurement of a time for the trainee user to respond to a query associated with the trainee first interaction.

19. The method of claim 13, wherein the trainee first interaction performance measurement comprises a facial recognition measurement of the trainee user.

20. The method of claim 13, wherein the set of trainee interactions are associated with a simulated particular customer persona.

* * * * *